July 7, 1942.　　　F. C. RUSHING ET AL　　　2,289,074
BALANCING MACHINE
Filed May 12, 1937　　　3 Sheets-Sheet 1

WITNESSES:
E. A. McCloskey
Nw. C. Groome

INVENTORS
Frank C. Rushing
and John G. Baker
BY
Paul E. Friedemann
ATTORNEY

Patented July 7, 1942

2,289,074

UNITED STATES PATENT OFFICE 2,289,074

BALANCING MACHINE

Frank C. Rushing and John G. Baker, Pittsburgh, Pa., assignors to Westinghouse Electric & Manufacturing Company, East Pittsburgh, Pa., a corporation of Pennsylvania Application May 12, 1937, Serial No. 142,158

4 Claims. (Cl. 73—53)

Our invention relates to balancing machines, and more particularly to balancing machines for indicating both the position and magnitude of unbalance of a rotor in two arbitrarily chosen planes of the rotor.

Quantity production of rotors for dynamoelectric machines, crank shafts, and other rotors has brought about the need for faster methods of unbalance indication. Also, refinements in machinery with respect to the elimination of both noise and vibration have resulted in the requirement of higher accuracy of unbalance indication. Further, since rotors very frequently do not distort symmetrically with a change in speed, it is desirable to determine the rotor unbalance at the normal operating speed of the rotor.

An unbalanced rigid rotor can be balanced by adding or subtracting weight in two or more arbitrarily chosen planes perpendicular to the axis of rotation. When the effective unbalance in each of these planes is removed the rotor is both statically and dynamically balanced. In a rotor that is not rigid, the above comments also apply but for only one speed of rotation.

Before a general statement of our invention is made and before the objects thereof are pointed out, a brief statement of the balancing devices and methods used heretofore will be helpful in clarifying our disclosure.

Various methods and apparatus have been used heretofore for determining unbalance corrections. The most primitive of the dynamic methods consists in flexibly mounting the rotor and adding or subtracting weight by trial until the mounting or rotor ceases to vibrate during rotation.

A number of types of machines are in use for determining more or less correctly the amount and position of unbalance effect in each of two correction planes without calculation. In general, such machines comprise the combination of some of the following elements: (1) a flexibly restrained carriage, pivoted or in effect pivoted about an axis or point contained in one of the two correction planes, in which the rotor to be balanced may be rotated; (2) an arrangement for measuring the amount and phase, with respect to rotation, of the motion of this carriage; and (3) means for introducing a known unbalance effect on the carriage adjustable or variable both in phase or in amount. Existing machines include either elements (1) and (2) or elements (1) and (3).

The element (1), common to all machines of the prior art, namely, the pivoted carriage, has the function of eliminating the effect, on the vibration of the carriage, of the unbalance component in one of the correction planes. This function is accomplished, since one of the balancing planes includes the pivot of the carriage; in this way any force caused by an unbalance in the plane of the pivot is directed to the pivot, or fixed point, and can, therefore, have no effect on the motion of the carriage because the motion can only be a rotation about the pivot.

It has, however, been found that certain rotors in coming up to speed distort non-symmetrically enough to make balancing at the normal or near normal operating speed very desirable. Balancing at normal speed in a pivoted carriage is usually very difficult for the following reasons, among others, that distortion of the carriage tends to displace the point of actual pivoting from the pivot point intended; and the large forces caused by the high speed rotation of an unbalanced rotor in a pivoted carriage results in severe vibration difficulties.

One object of our invention is to eliminate the need of a pivot point for the carriage of a rotor that is to be balanced.

Another object of our invention is to provide for mechanically determining the magnitude of unbalance of a rotor in two or more arbitrarily chosen planes of a rotor that is to be balanced.

It is also an object of our invention to secure indications of unbalance in two or more arbitrarily chosen correction planes without the necessity of making any but the simplest mechanical changes.

Other objects and advantages of our invention will become more apparent from a study of the following specification when considered in conjunction with the accompanying drawings, in which.

The invention disclosed and claimed in this application is primarily a mechanical unbalance indicating machine constituting in some respects an improvement as well in some respects a simplification of the subject matter disclosed and broadly claimed in our copending application Serial No. 46,312, filed October 23, 1935, and entitled Indicating balancing machines, now Patent No. 2,165,024, issued July 14, 1939. Fundamentally, the theory of operation of the invention constituting the subject matter of this application is in part the same as the theory applicable to the invention disclosed and claimed in the mentioned copending application. The apparatus disclosed in this application is, however, so designed that this application need not be burdened with the explanation of the general solution. The design of the embodiment of our invention herein disclosed will become more apparent from the following specification.

Figure 1:
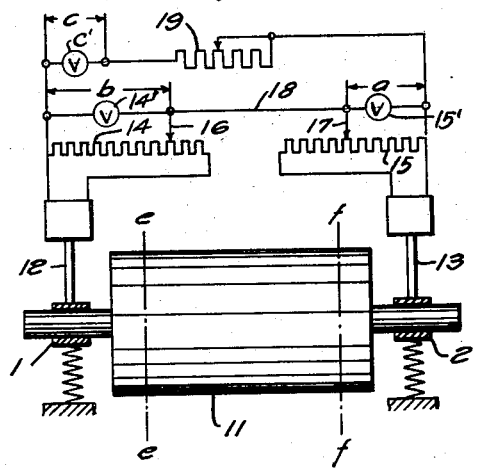
Figure 1 shows, schematically, a simple arrangement of electrical circuits for obtaining indications of unbalance in two arbitrarily chosen correction planes.
Figure 2:
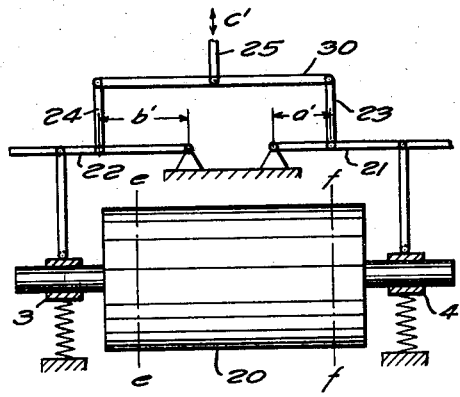
Figs. 2, 3 and 4 show, schematically, how mechanical means may be utilized to produce indications that correspond to indications that may be secured with the apparatus schematically illustrated in Fig. 1.
Figure 3:
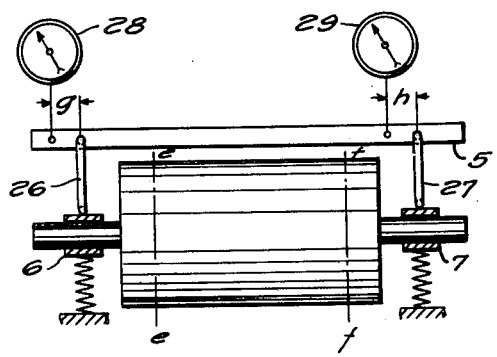
Figure 4:
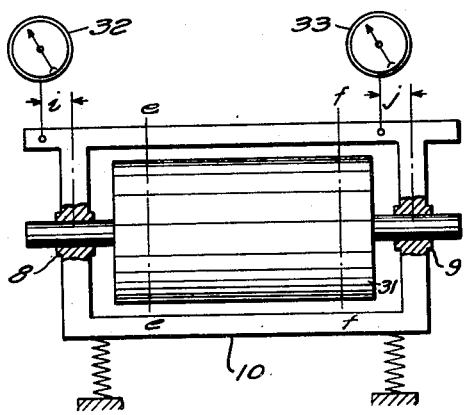

In the schematic showing of Figs. 1 and 2, all measurements are assumed to be taken in one plane including the bearings 1 and 2, and 3 and 4. Let that plane be considered the plane of the sheet upon which the drawings appear. In Fig. 3, the bar 5 as well as the bearings 6 and 7 are assumed to move in the plane of the sheet upon which Fig. 3 appears. In Fig. 4, the bearings 8 and 9 are part of a cradle 10 and the discussion to follow will be based on the assumption that the measurements on the cradle 10 are taken in the plane of the sheet upon which Fig. 4 appears.

Let $e$—$e$ and $f$—$f$ be considered the transverse correction planes for the rotors shown in all the figures. The choice of the correction planes will usually be dictated by the nature of the rotor, the unbalance of which is to be indicated. In short, the correction plane selected will depend upon where on a given rotor it is feasible to add or subtract weight to correct for the unbalance.

In Fig. 1, to calibrate the apparatus let the rotor 11 be perfectly balanced. (If no perfectly balanced rotor is available one may be readily secured by a cut-and-try method applied to our apparatus.) The bearings 1 and 2 are engaged by a pair of stems 12 and 13 which actuate a pair of like electric generators. These generators preferably each include a coil adapted to be oscillated in a magnetic field, preferably of uniform density, so that an alternating-current voltage, as indicated by meters 14' and 15', of like shape and of like amplitude will be impressed on the potentiometers 14 and 15 for oscillations of the bearings 1 and 2 of like magnitude and frequency. This means that the potential $c$, as indicated by meter $c'$, will equal zero if the potentiometers are connected in opposition, as shown, and voltages $a$ and $b$ are equal. It is not essential that potentiometers be used. Any circuit arrangement whereby the voltages $a$ and $b$ are so arranged that their sum is equal to zero will suffice.

By placing a known unbalance in the perfectly balanced rotor 11 in the transverse correction plane $f$—$f$ a voltage of one magnitude will be impressed across the potentiometer 15 and a voltage of another magnitude, and in all likelihood of a lesser magnitude, will be impressed across the potentiometer 14. Since there is no unbalance in the correction plane $e$—$e$ the voltage $b$ is the effect in plane $e$—$e$ by reason of the unbalance in the plane $f$—$f$. By shifting the ends 16 and 17 of the interconnecting lead 18 voltage $a$ may be made equal and opposite to voltage $b$ so that voltage $c$ is equal to zero. Since the system is linear, the voltages $a$ and $b$ will change proportionally to the unbalance in the correction plane $f$—$f$ with the result that voltage $c$ will always equal to zero, regardless of the unbalance in plane $f$—$f$, once the ends 16 and 17 are adjusted as explained.

If a known unbalance is now placed in the rotor 11 in the correction plane $e$—$e$ and the potentiometer setting discussed in the preceding paragraph is maintained then the new voltages $a$ and $b$ will be proportional to the unbalance in the correction plane $e$—$e$. Since the voltages $a$ and $b$ are proportional to the unbalance in plane $e$—$e$, their difference or sum $c$, as the case may be, will be proportional to the unbalance in the correction plane $e$—$e$ only. By suitable manipulation of the adjustable resistor 19 the voltage $c$, as indicated by meter $c'$, may express directly the units of mass of unbalance in correction plane $e$—$e$. From the preceding calibration it is apparent that unbalanced rotors one after another may be placed in the bearings 1 and 2 and the magnitude of the unbalance in correction plane $e$—$e$ may be determined from the voltage $c$. Similarly, the magnitude of the unbalance in correction plane $f$—$f$ may be determined.

With the apparatus discussed in this application the mechanical phase position of the unbalance is not automatically indicated but only the magnitude of the unbalance in a given plane is indicated. A skilled operator may however determine the phase of the unbalance with but very few trials.

Fig. 2 shows an arrangement that is the mechanical analog of the arrangement shown in Fig. 1. If a known unbalance is placed in the rotor 20 in the correction plane $f$—$f$ then the lever 21 will move through a given arc and lever 22 will move through another given arc. By shifting the attachment of rods 23 and 24 on levers 21 and 22, respectively, a zero movement of rod 25 may be obtained. When an unbalance is placed in correction plane $e$—$e$, a movement of rod 25 will be obtained that is a measure of the unbalance in plane $e$—$e$ only. Since the use of a system of levers is complicated and both difficult and expensive to use in practice, we utilize the scheme shown in Fig. 4.

Fig. 3 shows how the use of a system of levers shown in Fig. 2 may be simplified to the use of a single bar 5, actuated by the contact plungers 26 and 27, operating on two micrometer type indicators 28 and 29. The showing in Fig. 3 readily suggests the practical embodiment, i. e., the use of a cradle, as shown in Fig. 4.

If the rotor 20 in Fig. 2 is unbalanced by reason of an unbalance in one correction plane, it is clear that floating lever 30 will swing about a pivot disposed in the axis of rotation of the rotor. This means that if the mechanical lever system were flexible enough in possible arrangements, a point could be found on levers 21 and 22 for the attachment of rods 23 and 24 for an unbalance in plane $f$—$f$ such that rod 24 would not move at all. This naturally means that the movement of rod 23 would be proportional to the unbalance in plane $f$—$f$.

If two separate indicators are used as shown in Figs. 3, 4, 5 and 7, then an elaborate mechanical system is not longer necessary, and it is only necessary to shift the respective indicators to make them each indicate unbalance in one correction plane only. This will become more apparent from the following analysis: Assuming rotor 31 (see Fig. 4) is in perfect balance and an unbalance, preferably a known unbalance, is placed in the rotor 31 in the correction plane f—f. The unbalance thus inserted will cause an indication on micrometer 33 or other measuring means of one magnitude and an indication on micrometer 32 usually of considerably lesser magnitude. By shifting the micrometer 32 so that the point of engagement of the micrometer plunger is changed either to the right or left with reference to the cradle 10 a point or node may be found where the indication is zero. This means that the indications of micrometer 32 are independent of any unbalance in the correction plane f—f and such indications as it will give, when an unbalanced rotor is being tested for unbalance, will be proportional to the unbalance in the correction plane e—e.

By again using a balanced rotor 31 and inserting an unbalance in the rotor in the correction plane e—e and by shifting the micrometer 33 toward the right or left a point, or node, or center of percussion, may be found on the cradle 10 where the micrometer indicates zero oscillation. This means that the indications of the dial type micrometer 33 will be independent of any unbalance of the rotor in the correction plane e—e.

Once the micrometers are thus positioned at the two nodes unbalanced rotors, of the same type used for calibration, one after another may be mounted in the cradle 10 and the magnitudes of their respective unbalances in the correction planes e—e and f—f may be indicated simultaneously.

The micrometers, in the absence of calibration, may not indicate actual units of mass of unbalance but it is obvious that if the micrometer, while being subjected to a vibratory impulse caused by an unbalance of eight ounces, swings over forty-eight graduations of its dial, the proportionality factor is one-sixth. The actual mass of any unknown unbalance may thus readily be deduced from the readings of the micrometers.

Figure 5:
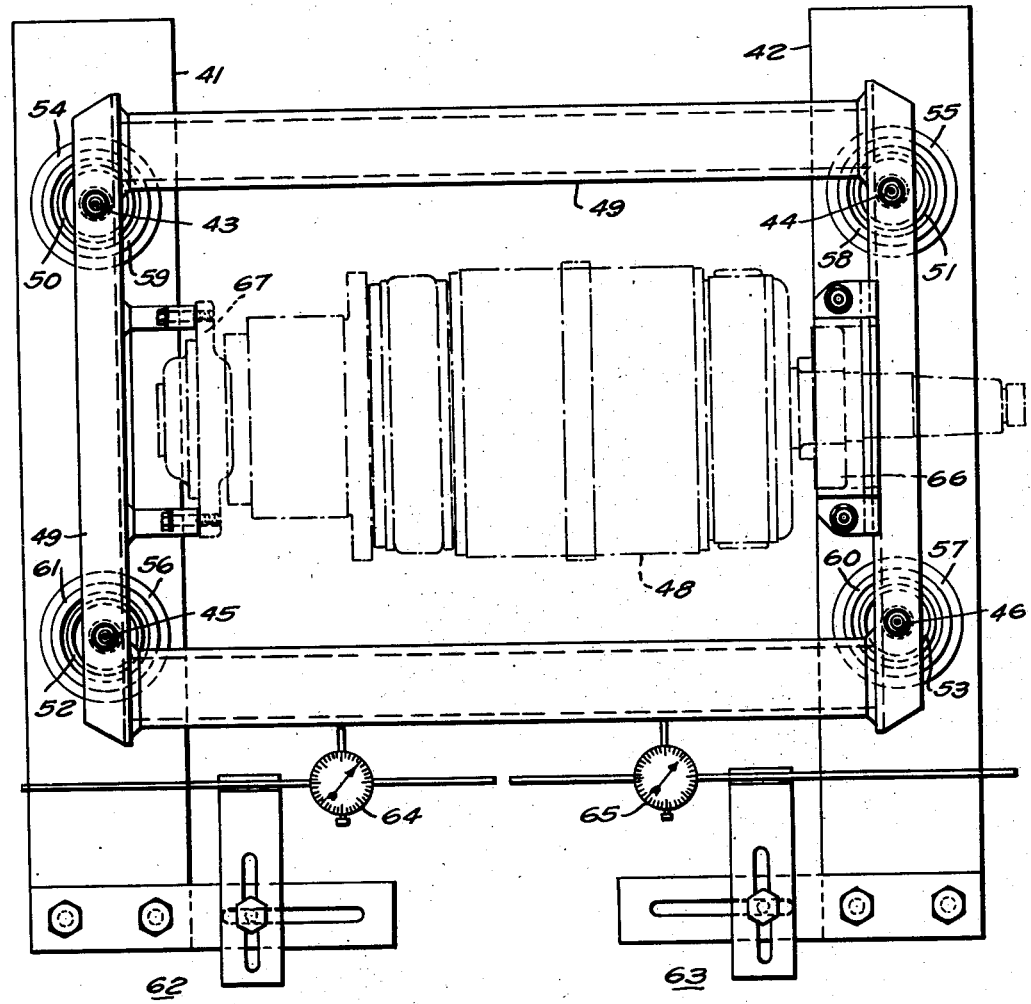
Fig. 5 is a plan view of an actual embodiment based on the theory of the schematic showing of Fig. 4.
Figure 6:
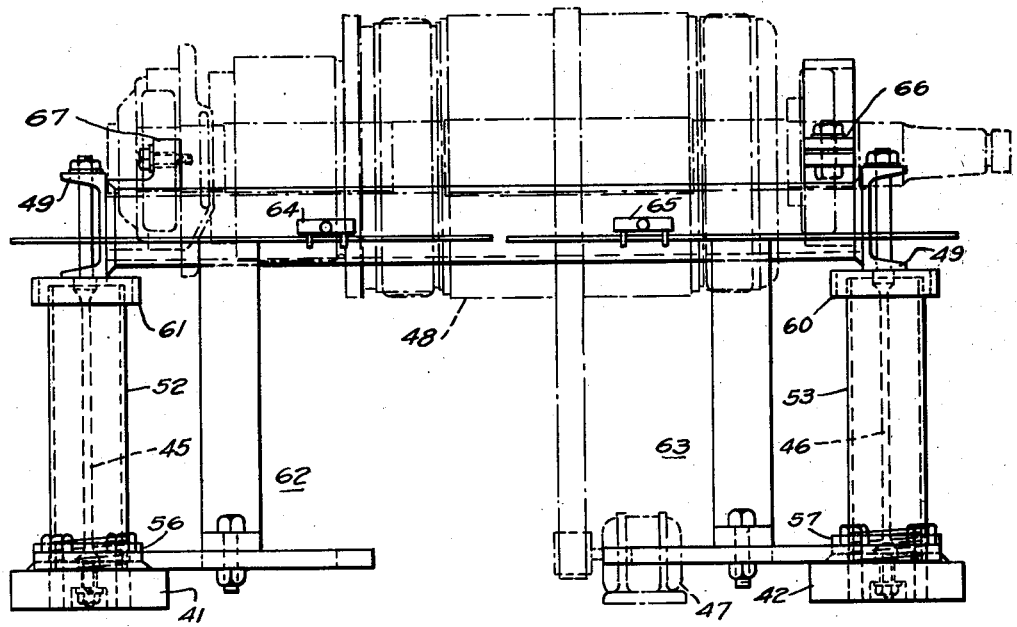
Fig. 6 is a side view of the subject matter shown in Fig. 5.
Figure 7:
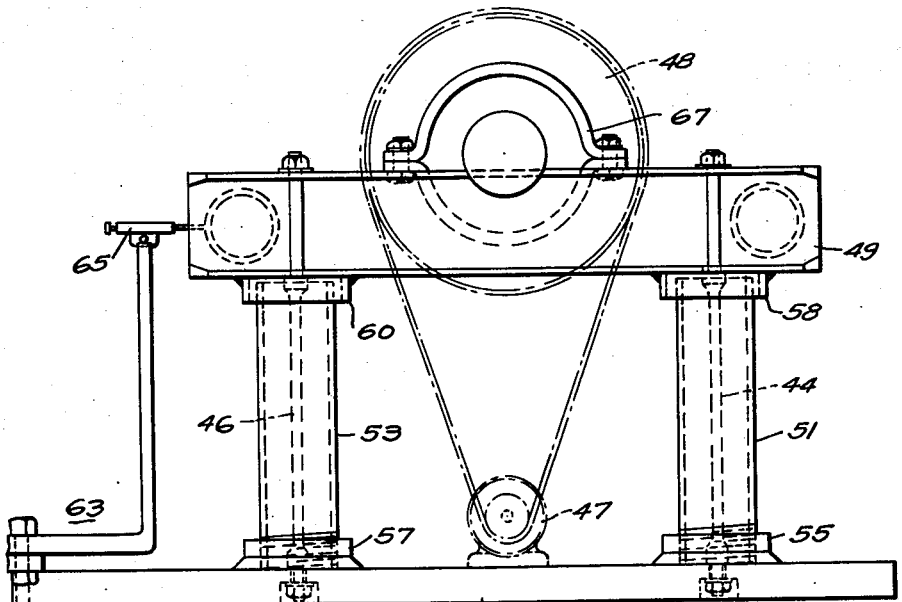
Fig. 7 is an end view of the subject matter shown in Figs. 5 and 6.

In the actual embodiment shown in Figs. 5, 6 and 7, the horizontal side beams 41 and 42 have bolted thereto four vertical rods 43, 44, 45 and 46 made of spring steel or other metal. The side beams may be bolted to the frame of a lathe or disposed in any other suitable relation to means as a motor 47 for rotating the rotor 48.

A generally rectangular frame, or cradle, 49 is bolted to the upper ends of the springs or rods 43, 44, 45 and 46. The end portions of the cradle consist of standard channel members to facilitate the attachment of the rods.

Since the rods are not, and should not be, sufficiently heavy and rigid to permit the mounting and removal of the rotor from the frame 49 we have provided novel simple and sturdy supporting means for the frame. The supporting means include four pipes 50, 51, 52 and 53 encircling the rods.

These pipes are threaded into nuts 54, 55, 56 and 57 welded to the beams 41 and 42, as shown. The pipes when screwed all the way down into the nuts do not engage the frame 49, however, whenever the frame 49 is to be rigidly supported on the pipes, the pipes may be turned by hand, or otherwise, to move vertically upward to engage the frame 49. The pipes thus take all the load of the frame and rotor. The rotors to be tested for unbalance may thus be placed on the cradle and removed therefrom without danger of any injury to the rods. During the testing of a rotor it is, of course, clear that the pipes must be screwed down to the position shown.

To limit the horizontal oscillations of the cradle 49 and also to eliminate the danger of breakage of the rods by reason of excessive horizontal oscillations of the cradle, a ring is disposed to loosely encircle the upper ends of each pipe. Each ring is welded to the cradle and is of sufficient internal diameter to prevent excessive horizontal oscillations of the cradle. These rings 58, 59, 60 and 61 are clearly shown in Figs. 5, 6 and 7.

At one side of the cradle we dispose a pair of supports 62 and 63, which may be of the character clearly indicated in Figs. 5 and 7, for adjustably supporting the micrometers 64 and 65.

The cradle is provided with a pair of bearings 66 and 67 which bearings may be longitudinally adjustable on the frame 49 to accommodate rotors of somewhat different lengths.

In practice, the procedure is briefly as follows: The operator first turns the pipes 50, 51, 52 and 53 up to rigidly support the cradle 49. A balanced rotor is then placed in the bearings of the cradle. The pipes are screwed down and the motor 47, belted to drive the rotor as shown, is started to check the rotor for unbalance. If the rotor is balanced the micrometers 64 and 65, though contacting the cradle and regardless of their longitudinal positions, will not be actuated.

The balanced rotor is then stopped and an unbalance, preferably a known unbalance, is placed in one correction plane. The motor 47 is again made to operate the rotor and one micrometer is shifted, as hereinbefore discussed, to a nodal position. The rotor is again stopped, the unbalance shifted to the other correction plane, the rotor started, and the other micrometer shifted to a nodal point. If in shifting the micrometers the nodal point is found to be beyond the range of the longitudinal adjustment of the micrometer then it is only necessary to change the center of gravity of the vibrating system by adding a small mass at some appropriate point.

Once the unbalance indicating machine has been adjusted as just explained the rotor is stopped, the pipes screwed up and the balanced rotor is removed. An unbalanced rotor of the same type as is used for calibration is then mounted in the bearings of the cradle, the pipes are screwed down, and the rotor caused to rotate at normal speed or any other speed. The operating speed is preferably several times the natural frequency. The micrometers will then simultaneously indicate the magnitude of unbalance in each correction plane. By a few trials the attendant may locate the phases of the unbalances. The magnitude of the correction to be made is then marked on the rotor at the correct phase position. From the indicia on the rotor, the correction may readily be made.

If a dial gauge vibrometer is being used the speed does not need to be held constant if the calibration speed was several times the natural frequency of the vibrating system.

We are aware that others skilled in the art, particularly after having had the benefit of the teachings of our invention may devise different mountings for both the rotor and the micrometers and otherwise rearrange the mechanical elements and electrical elements without departing from the spirit of this invention. We, therefore, wish to be limited only by the scope of the appended claims but do not wish to be limited to the specific structure hereinbefore disclosed.

We claim as our invention:

1. Apparatus for indicating the unbalance of rotors, in combination, a horizontally mounted support, four vertically disposed resilient rods bolted to the support, a cradle bolted to the upper ends of said rods and thus free to oscillate in a horizontal plane, means for relieving the rods of the weight of the cradle and whatever may be on the cradle, means for limiting the horizontal oscillations of the cradle, bearings on the cradle adapted to receive a rotor, means for rotating a rotor disposed in said bearings, an indicator, indicator supporting means disposed adjacent the frame, including means for permitting adjustment of said indicator to engage the cradle at a point at which no oscillations take place when the rotor is unbalanced only in a given correction plane of the rotor.

2. Apparatus for indicating the unbalance of rotors, in combination, a horizontally mounted support, four vertically disposed resilient rods bolted to the support, a cradle bolted to the upper ends of said rods and thus free to oscillate in a horizontal plane, means for limiting the horizontal oscillations of the cradle to a given horizontal path, bearings on the cradle adapted to receive a rotor, means for rotating a rotor disposed in said bearings, an indicator, indicator supporting means disposed adjacent the frame, and upon which means the indicator is adjusted so as to engage the cradle at a point of engagement at which no oscillations take place when the rotor is unbalanced only in a given correction plane of the rotor.

3. Apparatus for indicating the unbalance of rotors, in combination, a horizontally mounted support, four vertically disposed resilient rods bolted to the support, a cradle bolted to the upper ends of said rods and thus free to oscillate in a horizontal plane, means for relieving the rods of the weight of the cradle and whatever may be on the cradle, bearings on the cradle adapted to receive a rotor, means for rotating a rotor disposed in said bearings, an indicator, indicator supporting means disposed adjacent the frame, and upon which means the indicator is adjusted so as to engage the cradle at a point of engagement at which no oscillations take place when the rotor is unbalanced only in a given correction plane of the rotor.

4. Apparatus for indicating the unbalance of rotors, in combination, a horizontally mounted support, four vertically disposed resilient rods bolted to the support, a cradle bolted to the upper ends of said rods and thus free to oscillate in a horizontal plane, bearings on the cradle adapted to receive a rotor, means for rotating a rotor disposed in said bearings, an indicator, indicator supporting means disposed adjacent the frame, and upon which means the indicator is adjusted so as to engage the cradle at a point of engagement at which no oscillations take place when the rotor is unbalanced only in a given correction plane of the rotor.

FRANK C. RUSHING.
JOHN G. BAKER.